(12) United States Patent
Bowers

(10) Patent No.: US 6,581,961 B1
(45) Date of Patent: Jun. 24, 2003

(54) DEACTIVATION OF SECOND STAGE OF AIR BAG INFLATOR

(75) Inventor: Paul A. Bowers, Ray, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/466,465

(22) Filed: Dec. 17, 1999

(51) Int. Cl.$^7$ ............................................. B60R 21/32
(52) U.S. Cl. .............. 280/735; 280/728.1; 280/730.1; 280/732; 280/741; 280/742
(58) Field of Search .......................... 280/728.1, 730.1, 280/732, 735, 736, 741, 742

(56) References Cited

U.S. PATENT DOCUMENTS

| | | | |
|---|---|---|---|
| 5,413,378 A | | 5/1995 | Steffens, Jr. et al. |
| 5,460,405 A | | 10/1995 | Faigle et al. |
| 5,573,269 A | * | 11/1996 | Genty et al. ............... 280/735 |
| 5,626,359 A | * | 5/1997 | Steffens et al. ............ 280/735 |
| 5,628,528 A | | 5/1997 | DeSautelle et al. |
| 5,670,853 A | * | 9/1997 | Bauer ................. 280/730.1 X |
| 5,769,452 A | * | 6/1998 | Yoshida ...................... 280/735 |
| 5,864,295 A | | 1/1999 | Jarocha |
| 5,868,423 A | * | 2/1999 | Takimoto et al. ........... 280/735 |
| 5,871,231 A | * | 2/1999 | Richards et al. ..... 280/743.1 X |
| 5,954,360 A | * | 9/1999 | Griggs et al. ............... 280/735 |
| 5,992,880 A | * | 11/1999 | Cuddihy et al. ............ 280/735 |
| 6,019,389 A | | 2/2000 | Burgi et al. |
| 6,026,340 A | * | 2/2000 | Corrado et al. ............ 280/735 |
| 6,082,764 A | * | 7/2000 | Seki et al. .................. 280/735 |
| 6,109,647 A | * | 8/2000 | Akaba et al. ........... 280/735 X |
| 6,139,052 A | * | 10/2000 | Preamparasitchai ......... 280/735 |
| 6,158,768 A | * | 12/2000 | Steffens et al. ............. 280/735 |
| 6,188,940 B1 | * | 2/2001 | Blackburn et al. .......... 280/735 |
| 6,189,928 B1 | * | 2/2001 | Sommer et al. ........ 280/735 X |
| 6,373,557 B1 | | 4/2002 | Mengel et al. |

FOREIGN PATENT DOCUMENTS

| | | | |
|---|---|---|---|
| DE | 19610833 | 9/1996 | |
| DE | 19757595 | 1/1999 | |
| DE | 19740020 | 3/1999 | |
| DE | 19740020 A1 | 3/1999 | |
| DE | 19757595 A1 | 7/1999 | |
| JP | 404113954 | * 4/1992 | ................ 280/735 |
| JP | 405162646 | * 6/1993 | ................ 280/735 |
| WO | WO9912777 | 3/1999 | |
| WO | WO9934235 | 7/1999 | |

* cited by examiner

Primary Examiner—Paul N. Dickson
Assistant Examiner—Toan To
(74) Attorney, Agent, or Firm—Tarolli, Sundheim, Covell & Tummino L.L.P.

(57) ABSTRACT

An apparatus (10) for helping to protect a vehicle occupant (52) includes an inflatable device (20). The apparatus (10) also includes a primary inflation fluid source (32) and a secondary inflation fluid source (34) that are actuatable independently of each other. The apparatus (10) includes means (60, 70, 80, 90, 100) for actuating the primary inflation fluid source (32) to inflate the inflatable device (20) to help protect the vehicle occupant (52) without actuating the secondary inflation fluid source (34). The apparatus (10) also includes means (60, 70, 80) for sensing the position of the vehicle occupant (52) subsequent to actuation of the primary inflation fluid source (32) and for providing an output signal (64, 71, 82). The apparatus 10 further includes means (100, 38) for actuating the secondary inflation fluid source (34) in response to the output signal.

13 Claims, 4 Drawing Sheets

DEACTIVATION OF SECOND STAGE OF AIR BAG INFLATOR

BACKGROUND OF THE INVENTION

1. Technical Field

The present invention relates to a vehicle occupant protection apparatus including an air bag inflator. In particular, the present invention relates to the deactivation, for safety reasons, of the second stage of a dual stage air bag inflator, in the case when only the first stage is actuated to inflate the air bag.

2. Description of the Prior Art

An inflator for an inflatable vehicle occupant protection device, such as an air bag, includes a source of inflation fluid. The source of inflation fluid may be an ignitable material which, when ignited, rapidly generates a large volume of inflation fluid in the form of gas. The inflator may alternatively contain a stored quantity of pressurized inflation fluid, or a combination of pressurized inflation fluid and ignitable material for heating the inflation fluid.

Some inflators are of the "dual stage" type and include two separate, independently actuatable inflation fluid sources ("stages"). The two inflation fluid sources can be actuated simultaneously or at different times to tailor the rate and volume of flow of inflation fluid out of the inflator. In some cases, only one of the inflation fluid sources is actuated, for example, when a relatively low fluid flow rate is desired. In these cases, the second inflation fluid source remains active after deployment of the air bag. It is desirable, for safety reasons, to deactivate the second inflation fluid source when it has not been used to inflate the air bag.

SUMMARY OF THE INVENTION

The present invention is an apparatus for helping to protect a vehicle occupant. The apparatus comprises an inflatable device. The apparatus comprises a primary inflation fluid source and a secondary inflation fluid source actuatable independently of each other. The apparatus further comprises means for actuating the primary inflation fluid source to inflate the inflatable device to help protect the vehicle occupant without actuating the secondary inflation fluid source. The apparatus also comprises means for sensing the position of the vehicle occupant subsequent to actuation of the primary inflation fluid source and for providing an output signal. The apparatus further includes means for actuating the secondary inflation fluid source in response to the output signal.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
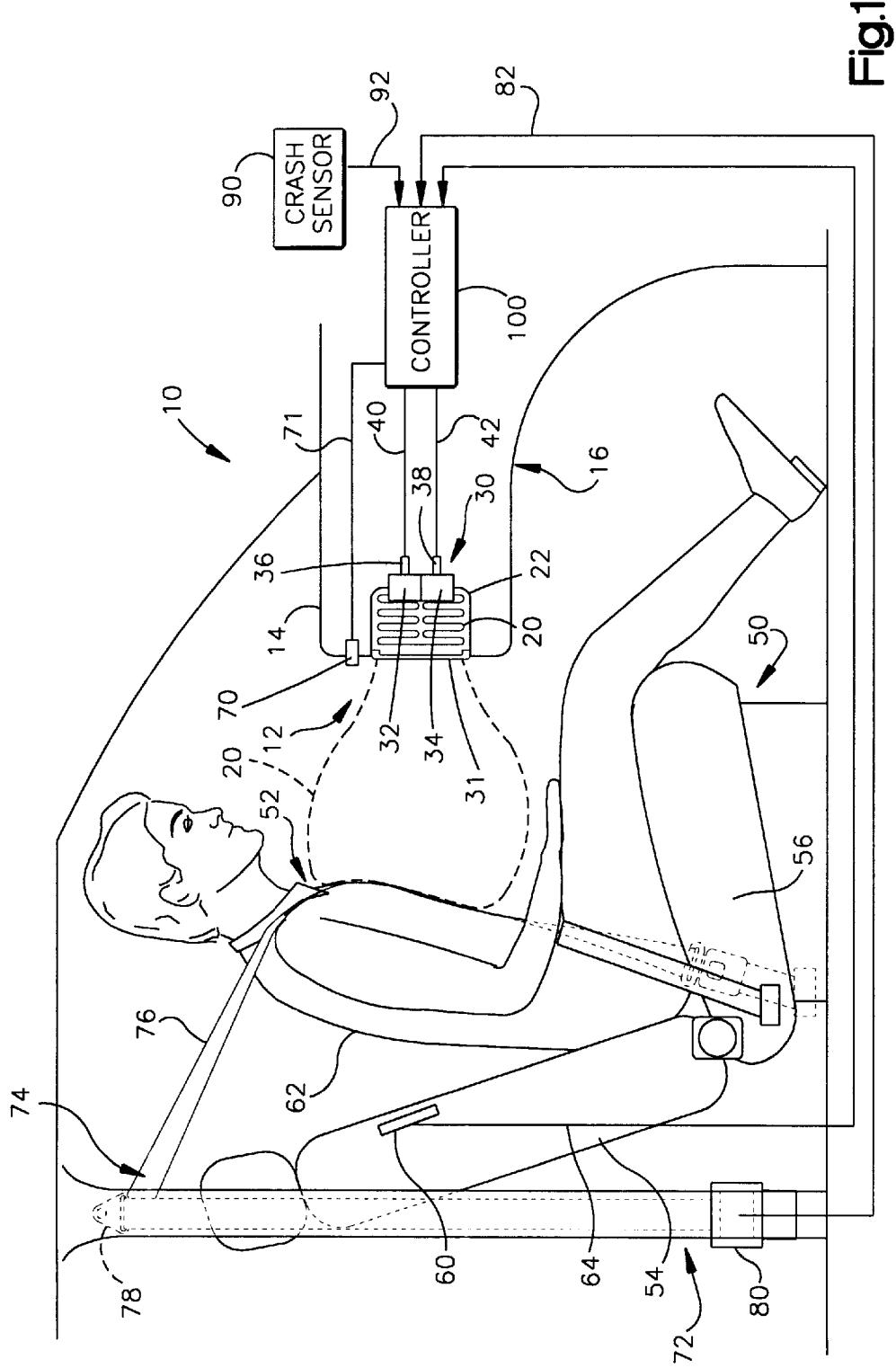
FIG. 1 is a schematic view of a vehicle safety apparatus that is a first embodiment of the present invention, including an air bag and an occupant shown in a first condition.
Figure 2:
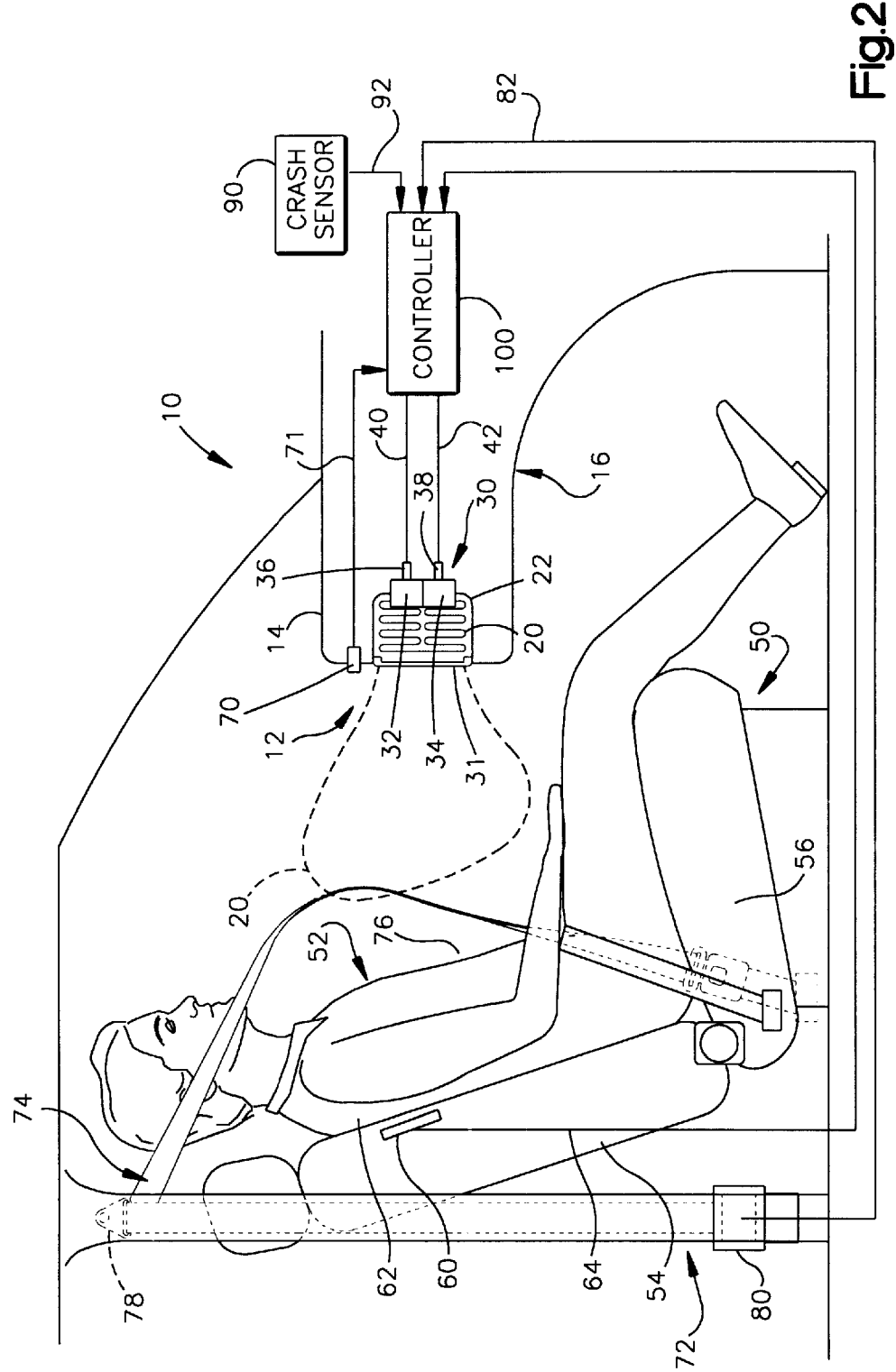
FIG. 2 is a view similar to FIG. 1 showing the air bag and the occupant in a second condition.

The present invention relates to a vehicle safety apparatus including an air bag inflator. In particular, the present invention relates to a vehicle safety apparatus including a dual stage air bag inflator. As representative of the present invention, FIG. 1 illustrates a vehicle safety apparatus or occupant protection system 10.

The system 10 includes an air bag module 12 mounted in an opening of an instrument panel 14 of a vehicle 16. The air bag module 12 includes an air bag 20 folded within a housing 22. The air bag module 12 also includes an inflator 30 and a cover 31 that hides the other components of the module from view. The cover 31 is adapted to open easily upon inflation of the air bag 20.

The inflator 30 includes first and second stages or inflation fluid sources 32 and 34. Each one of the inflation fluid sources 32 and 34 is of a known type and may comprise a quantity of ignitable gas-generating material, a quantity of stored gas under pressure, a combustible mixture of gases, or a quantity of stored gas together with pyrotechnic material for heating the stored gas.

The inflator 30 also includes a first initiator 36 associated with the first inflation fluid source 32 and a second initiator 38 associated with the second inflation fluid source 34. The first initiator 36 is electrically actuatable by an actuation signal over a lead wire 40 to actuate the first inflation fluid source 32. The second initiator 38 is electrically actuatable by an actuation signal over a lead wire 42 to actuate the second inflation fluid source 34. The first and second initiators 36 and 38 are electrically separate and are independently actuatable. As a result, the first and second inflation fluid sources 32 and 34 are independently actuatable.

The vehicle 16 includes a seat 50 for an occupant 52 of the vehicle, in this case, the front seat passenger. The seat 50 is disposed rearward in the vehicle 16 of the air bag module 12. The seat includes a seatback 54 and a seat bottom cushion 56.

The system 10 includes an occupant position sensor 60 mounted in the seatback 54. The occupant position sensor 60 is a known sensor operative to sense the presence of the torso 62 of the occupant 52 of the seat 50, when the occupant is leaning back in contact with the seatback 54, and to provide an appropriate output signal over a lead wire 64. The sensor 60 may be a weight sensor, a pressure sensor, or another known type of sensor.

The system 10 includes another occupant position sensor 70 mounted in the instrument panel 14. The occupant position sensor 70 is a known sensor operative to sense whether the occupant 52 is leaning back in the seat 50 or is leaning forward, and to provide an appropriate output signal over a lead wire 71. The sensor 70 is preferably an ultrasonic sensor but may be any known type of sensor.

The vehicle 16 includes a seat belt system 72 for helping to protect the occupant 52 of the seat 50. The seat belt system 72 includes a length of belt webbing 74. The length of belt webbing 74 includes a torso portion 76 that extends across the torso 62 of the vehicle occupant 52 and through a D-ring 78.

The system 10 includes an occupant condition sensor 80 associated with the belt webbing 74. The occupant condition sensor 80 is a known sensor operative to sense the tension in the torso portion 76 of the seat belt webbing 74 and to provide an appropriate output signal over a lead wire 82. The sensed tension in the torso portion 76 of the seat belt webbing 74 is indicative of whether the occupant is leaning back in the seat 50 against the seat back 54 or is leaning forward against the torso portion of the belt webbing.

The system 10 also includes one or more vehicle crash sensors 90. The crash sensors 90 may be any of several known types. For example, the crash sensors 90 may be mechanical inertia switches, such as rolamite sensors, or electrical accelerometers. The crash sensors 90 are operative to sense one or more crash conditions of the vehicle 16 and to provide an appropriate output signal over a lead wire 92.

The system 10 further includes an electronic controller 100, such as a microcomputer. The controller 100 is operatively connected to the crash sensor 90 and to the occupant condition sensors 60, 70 and 80. The controller 100 incorporates one of several crash algorithms known in the art for discriminating between deployment and non-deployment crash conditions and, in response, determining whether to deploy the air bag 20.

The controller 100 controls the inflation fluid sources 32 and 34 during a deployment crash condition in response to the position of the occupant 52 as sensed by the sensors 60, 70 and 80. Control of the inflation fluid sources 32 and 34 may also be responsive to the crash severity as sensed by the crash sensor 90, and to the sensed weight of the occupant 52.

For example, in a vehicle crash of relatively low severity, or if the occupant 52 is leaning forward in the seat 50, the controller 100 may actuate only the first inflation fluid source 32 to inflate the air bag 20 at a relatively slow rate and to a relatively low pressure. On the other hand, in a vehicle crash of relatively great severity, or if the occupant 52 is sensed to be leaning back against the seatback 54, the controller 100 may actuate both the first inflation fluid source 32 and the second inflation fluid source 34. This will inflate the air bag 20 at a relatively high rate and to a relatively high pressure. The second inflation fluid source 34 may be actuated at the same time as the first inflation fluid source 32 or at a selected time interval after the actuation of the first inflation fluid source.

In the event of a deployment crash condition involving sudden vehicle deceleration, or other event for which protection of the vehicle occupant 52 may be desired, the sensors 60, 70, 80 and 90 provide appropriate output signals that are inputs to the controller 100. The controller 100 compares the outputs of the sensors 60, 70, 80 and 90 with outputs found in a look-up table, for example.

Depending on the outcome of this comparison, the controller 100 determines whether or not to actuate the first inflation fluid source 32. If the controller 100 determines that the first inflation fluid source 32 should be actuated, an appropriate firing sequence is sent to the inflator 30. The firing sequence includes an actuation signal sent by the controller 100 to the first initiator 36 to energize the first initiator. The controller 100 simultaneously determines whether and when to actuate the second inflation fluid source 34. If the second inflation fluid source 34 is to be actuated, then the firing sequence also includes an appropriate actuation signal for energizing the second initiator 38.

When the first initiator 36 is energized, the first inflation fluid source 32 is actuated. Inflation fluid from the first inflation fluid source 32 is directed into the air bag 20 to inflate the air bag. The air bag 20 inflates in a first direction away from the instrument panel 14, into a position between the vehicle occupant 52 and the instrument panel. If the second initiator 38 also is energized, the second inflation fluid source 34 is actuated, to increase the pressure and/or flow rate of inflation fluid flowing into the air bag 20.

Because of the sudden vehicle deceleration, the upper torso 62 of the occupant 52 comes off the seatback 54, moving in a second direction in the vehicle, opposite the first direction, toward the instrument panel 14, after the firing sequence is sent to the inflator 30 by the controller 100. FIG. 1 illustrates the air bag 20 in an inflated condition, with the occupant leaning forward in the seat 50 against the inflated air bag. As this forward movement of the occupant 52 occurs, the torso portion 76 of the seat belt webbing 74 is tensioned. Subsequently, the occupant 52 rebounds (returns to a position against the seatback 54), moving in the first direction away from the instrument panel 14. The torso portion 76 of the seat belt webbing 74 is at least temporarily untensioned.

If both the first inflation fluid source 32 and the second inflation fluid source 34 have been actuated to deploy the air bag 20, the entire inflator 30 is no longer active. If, however, only the first inflation fluid source 32 has been actuated, the second initiator 38 and the second inflation fluid source 34 remain active. It is then desirable for safety reasons to deactivate the second initiator 38 and the second inflation fluid source 34.

Deactivation is effected by energizing the second initiator 38 and thereby actuating the second inflation fluid source 34. Actuation of the second inflation fluid source 34 causes a significant quantity of inflation fluid under pressure to be directed into the air bag 20. To limit the potential for injury to the vehicle occupant 52, it is desirable not to perform this deactivation if the occupant is leaning forward against or is close to the air bag 20 or the instrument panel 14.

Figure 3:
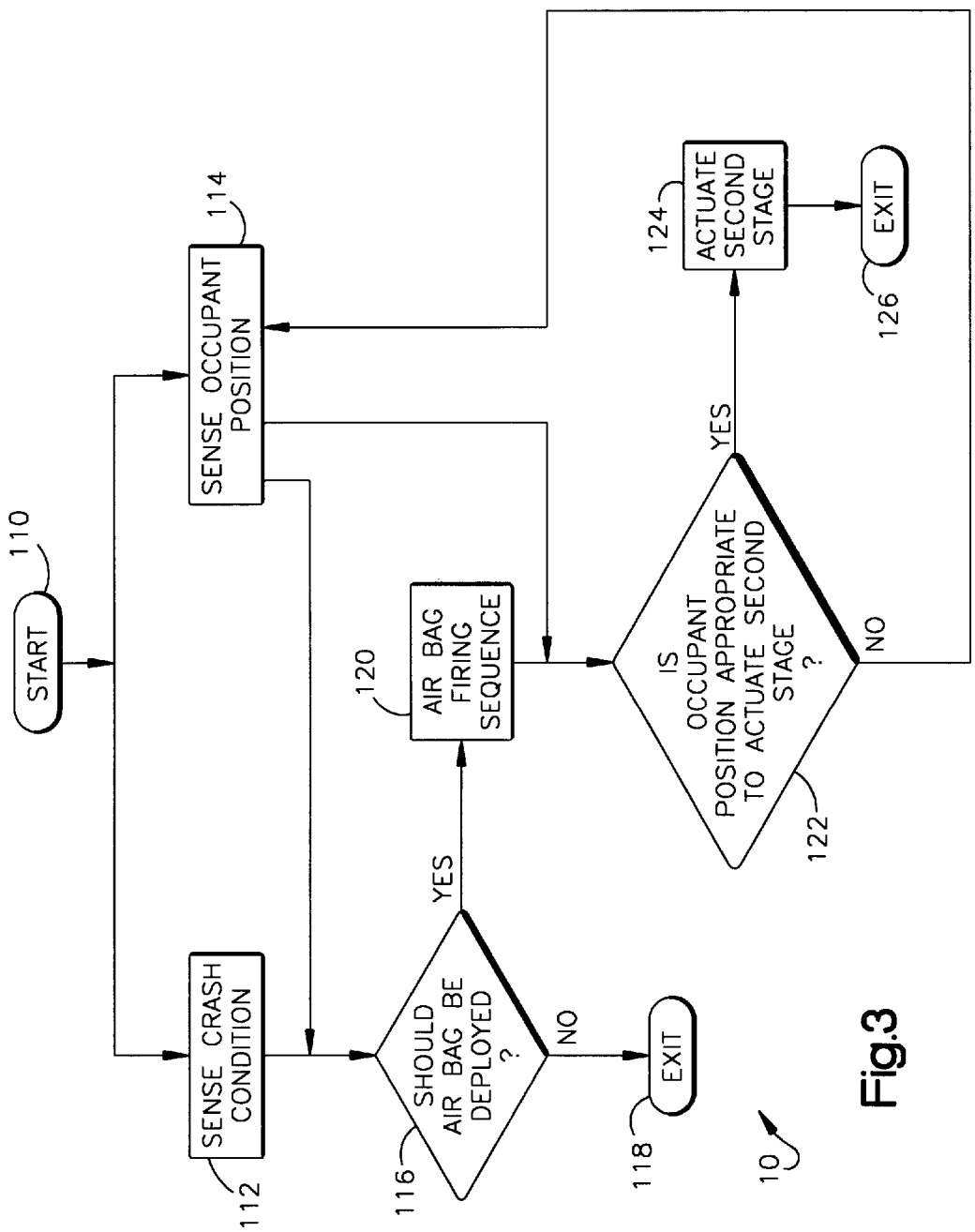
FIG. 3 is a flow diagram illustrating the operation of the vehicle safety apparatus of FIG. 1.

Therefore, the system 10 initiates deactivation of the second inflation fluid source 34 only when the controller 100 determines that the occupant 52 is in a safe or appropriate position for deactivation. The controller 100 makes this determination by periodically checking the position of the vehicle occupant 52 relative to the vehicle seatback 54. FIG. 3 illustrates the operation of the vehicle safety apparatus 10 in this regard.

In step 110 (FIG. 3), the system 10 is in a start condition. In step 112, the crash sensor 90 of the system 10 senses a crash condition of the vehicle 16. Simultaneously, in step 114, the occupant condition sensors 60, 70 and 80 sense the position of the occupant 52 relative to the vehicle seatback 54.

The outputs of the crash sensor 90 and of the occupant position sensors 60, 70 and 80 are directed to the controller 100, which determines, in step 116, whether the air bag 20 should be deployed. If the air bag 20 is to be deployed, the controller 100 also at this time determines whether and when the second inflation fluid source 34 should be actuated in addition to the first inflation fluid source 32.

If the controller 100 determines at step 116 that the air bag 20 should not be deployed, the process then proceeds to step 118 at which the process ends. If, on the other hand, the controller determines at step 116 that the air bag 20 should be deployed, a firing sequence is sent to the inflator at step 120. The firing sequence causes the first initiator 36 to be energized, and the first inflation fluid source 32 is actuated. If the second inflation fluid source 34 is to be actuated also, the firing sequence causes the second initiator 38 to be energized also.

The process then continues as illustrated in FIG. 3 at step 122 to effect deactivation of the secondary inflation fluid source 34, in case it was not actuated to inflate the air bag 20. (If the secondary inflation fluid source 34 has already been actuated, there is no harm in sending another actuation signal to the inactive second initiator 38.)

At step 122, the controller 100 makes an initial determination of whether the occupant 52 is in an appropriate position to actuate (and thereby deactivate) the second inflation fluid source 34. This initial determination is made on the basis of a second sensing of the position of the occupant 52 in the seat 50. This second sensing of occupant position takes place at a later time than the first sensing of occupant position that is used to make the initial air bag deployment determination at step 116.

Specifically, after the air bag 20 is deployed, the occupant position sensor 60 mounted in the seatback 54 provides an output signal that is indicative of whether the occupant's torso 62 is in contact with the seatback. If the occupant's torso 62 is indicated to be in contact with the seatback 54, then the controller 100 can determine at step 122 that the occupant 52 is far enough away from the instrument panel 14 to actuate the second inflation fluid source 34 at step 124 without adverse consequences to the occupant. The output signal from the occupant position sensor 60 can be provided continuously to the controller 100, so that the deactivation of the second inflation fluid source 34 can be effected immediately upon the occupant's torso 62 coming into contact with the seatback 54.

Similarly, after the air bag 20 is deployed, the occupant position sensor 70 mounted in the instrument panel 14 provides an output signal that is indicative of the occupant's distance from the vehicle instrument panel. On the basis of this output signal, the controller 100 can determine at step 122 whether the occupant 52 is far enough away from the instrument panel 14 to actuate the second inflation fluid source 34 at step 124 without adverse consequences to the occupant. The output signal from the occupant condition sensor 70 can be provided continuously to the controller 100, so that the deactivation of the second inflation source 34 can be effected immediately upon the occupant's moving a sufficient distance from the vehicle instrument panel.

Similarly, after the air bag 20 is deployed, the occupant condition sensor 80 associated with the belt webbing 74 provides an output signal that is a function of the tension in the torso portion 76 of the seat belt webbing. The amount of tension is indicative of whether the occupant 52 is leaning back in the seat 50 or is leaning forward against the torso portion 76 of the seat belt webbing 74. On the basis of this output signal, the controller 100 can determine at step 122 whether the occupant 52 is far enough away from the instrument panel 14 to actuate the second inflation fluid source 34 at step 124 without adverse consequences to the occupant. The output signal from the occupant condition sensor 80 can be provided continuously to the controller 100, so that the deactivation of the second inflation fluid source 34 can be effected immediately when the tension in the torso portion 67 of the seat belt webbing drops to a low enough level.

In this manner, if the controller 100 initially determines at step 122 that the occupant 52 is in an appropriate position to actuate the second inflation fluid source 34, then an actuation signal is sent to the inflator 30 and the second inflation fluid source is actuated at step 124. The process then proceeds to step 126 at which point the process ends.

If, however, the controller 100 initially determines at step 122 that the occupant 52 is not in an appropriate position to actuate the second inflation fluid source 34, then the occupant's position is again checked by sensing, for a third time, at step 114. This third sensing takes place at a later time that the second sensing of occupant position described above. Typically the vehicle occupant 52 begins to move rearward in the vehicle 16, in a direction away from the instrument panel 14 and the air bag module 12, within a short period of time after the inception of the crash event and deployment of the air bag 20.

The controller 100 then determines for a second time, at step 122, whether the occupant 52 is in an appropriate position to actuate the second inflation fluid source 34. This second determination is made at a later time than the initial determination, described above, of whether the occupant 52 is in an appropriate position to actuate the second inflation fluid source 34. It should be understood that any such "later" determination can be made by actively checking, at a discrete time interval, the state of one or all of the occupant condition sensors 60, 70 and 80. Alternatively, the controller 100 can be continuously monitoring occupant condition signals that are provided continuously by the occupant condition sensors 60, 70 and 80.

This sequence of (a) sensing occupant position and (b) determining whether to actuate the second inflation fluid source 34, continues until the occupant 52 is determined at step 122 to be in a position far enough away from the instrument panel 14 that the occupant would not be adversely affected by the additional inflation of the air bag 20 upon actuation of the second inflation fluid source 34. This safe or appropriate position of the vehicle occupant typically occurs within a reasonably short period of time after deployment of the air bag 20. The output of any one, or more, of the three occupant position sensors 60, 70 and 80 can be used to make this determination at step 122.

When the determination is thus made that the occupant 52 is in a position far enough away from the instrument panel 14 so as not to be adversely affected by additional inflation of the air bag 20, an actuation signal is sent to the inflator 30 and the second inflation fluid source is actuated at step 124. The process then proceeds to step 126 at which point the process ends.

Figure 4:
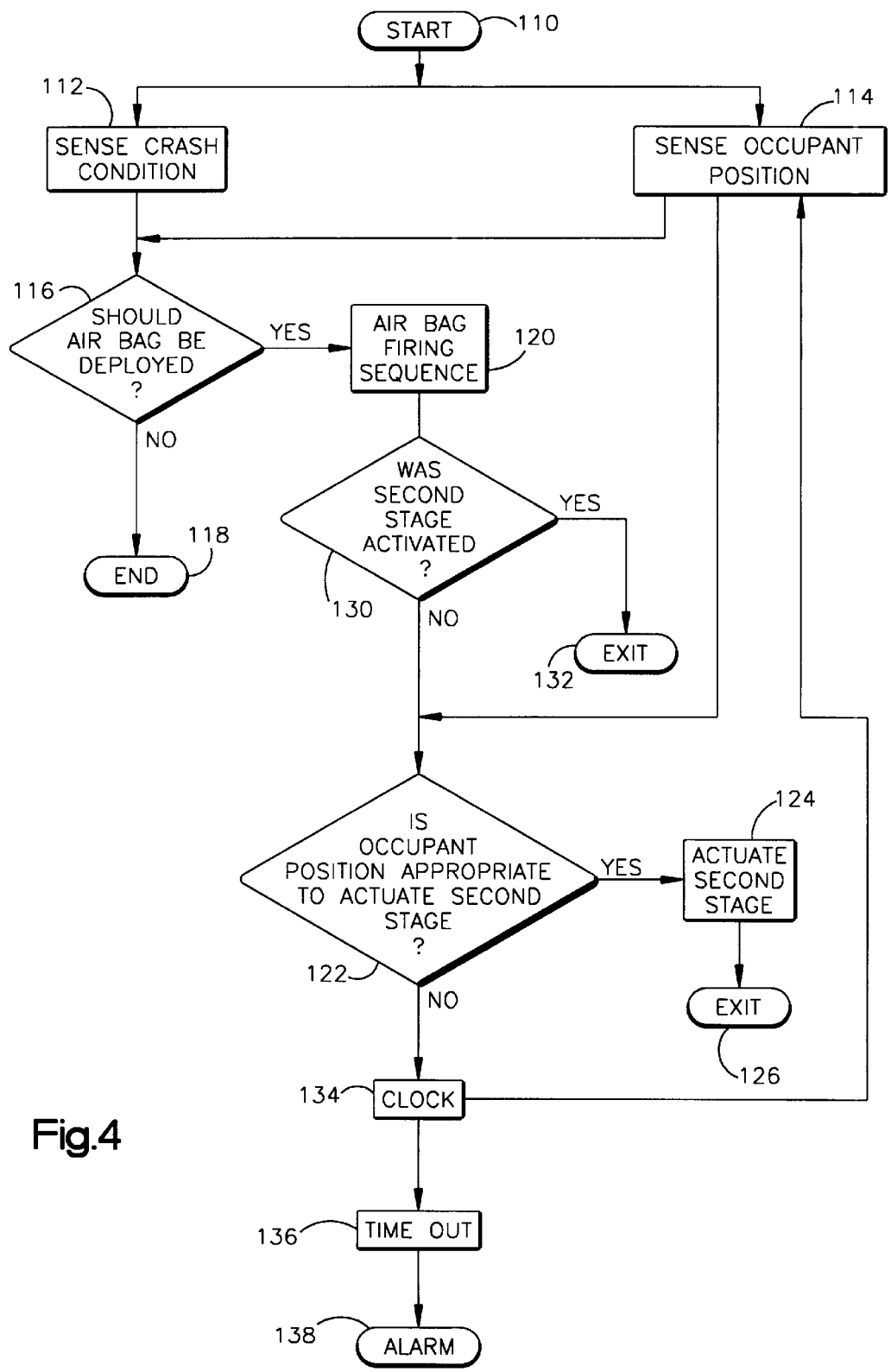
FIG. 4 is a flow diagram similar to FIG. 3 illustrating the operation of a vehicle safety apparatus that is a second embodiment of the invention.

FIG. 4 illustrates the operation of a safety apparatus or system 10a that is a second embodiment of the invention. In this embodiment, the controller 100, after providing the air bag firing sequence at step 120, proceeds to step 122 only if the second inflation fluid source 34 was not actuated. Thus, the process illustrated in FIG. 4 includes the additional step 130 in which the controller 100 determines whether the second inflation fluid source 34 was actuated. A "yes" answer to this determination in step 130 causes the process to terminate in step 132. A "no" answer to the determination in step 130 causes the process to proceed to step 122 and then continue as described above.

Also illustrated in FIG. 4 is a series of steps that may optionally be incorporated in conjunction with the determinations made in step 122. Specifically, the system as illustrated in FIG. 4 includes a step 134 for checking the amount of time elapsed after the air bag deployment sequence is initiated at step 120. After each step 122 determination that results in a "no" answer, then the elapsed time is checked at step 134. If the elapsed time as checked at step 134 is less than a predetermined period of time, then the process continues by further sensing of occupant position at step 114.

On the other hand, if the elapsed time as checked at step 134 is greater than the predetermined period of time, the operation times out at step 136 and an alarm is actuated at step 138. The alarm is a device that indicates the presence in the vehicle of an active inflation fluid source in the inflator 30. The alarm can be a light or other warning signal. The alarm can alert emergency medical service personnel, for example, who may be attending to the vehicle occupant 52 as a result of a vehicle crash, by telling them that the inflator is still active.

From the above description, a person having ordinary skill in the art will recognize that the controller 100, lead wire 40, and the first initiator 36 constitute means for actuating the primary inflation fluid source. One of ordinary skill in the art will also recognize that the controller 100, lead wire 42, and the second initiator 38 constitute means for actuating the secondary inflation fluid source. Additionally, one of ordinary skill in the art will recognize that any one of sensors 60, 70, and 80 constitutes means for sensing the position of the vehicle occupant and providing an output signal.

From the above description of the invention, those skilled in the art will perceive improvements, changes and modifications in the invention. For example, the invention may be applied to any type of inflator at any seating position such as a driver side inflator or a side impact inflator. Alternatively, the invention may be applied to a different type of inflatable device, such as an inflatable knee bolster or a side curtain. The invention may include sensors for sensing the position of the occupant's knees or legs, for example, in the case of an inflatable knee bolster. Such improvements, changes and modifications within the skill of the art are intended to be covered by the appended claims.

Having described the invention, I claim:

1. An apparatus for helping to protect a vehicle occupant, said apparatus comprising:
   an inflatable vehicle occupant protection device;
   a primary inflation fluid source and a secondary inflation fluid source actuatable independently of each other;
   means for actuating said primary inflation fluid source to inflate said inflatable device to help protect the vehicle occupant without actuating said secondary inflation fluid source;
   means for sensing the position of the vehicle occupant subsequent to actuation of said primary inflation fluid source and for providing an output signal, said means for sensing being operable to sense occupant position independent of pressure within said inflatable vehicle occupant protection device; and
   means for actuating said secondary inflation fluid source in response to said output signal.

2. An apparatus for helping to protect a vehicle occupant, said apparatus comprising:
   an inflatable vehicle occupant protection device;
   a primary inflation fluid source and a secondary inflation fluid source actuatable independently of each other;
   a first initiator being actuatable to actuate said primary inflation fluid source to inflate said inflatable device without actuating said secondary inflation fluid source;
   a sensor for sensing the position of the vehicle occupant subsequent to actuation of said primary inflation fluid source and for providing an output signal indicative of the sensed position;
   a second initiator being actuatable to actuate said secondary inflation fluid source in response to said output signal; and
   a controller for monitoring the output signal and for actuating said second initiator to actuate the second inflation fluid source subsequent to the inflatable device restraining forward movement of the occupant.

3. An apparatus for helping to protect a vehicle occupant, said apparatus comprising:
   an inflatable vehicle occupant protection device;
   a primary inflation fluid source and a secondary inflation fluid source actuatable independently of each other;
   means for actuating said primary inflation fluid source to inflate said inflatable device to help protect the vehicle occupant without actuating said secondary inflation fluid source;
   means for sensing the position of the vehicle occupant subsequent to actuation of said primary inflation fluid source and for providing an output signal; and
   means for actuating said secondary inflation fluid source in response to said output signal,
   wherein said means for actuating said secondary inflation fluid source in response to said output signal comprises a controller that periodically checks the position of the vehicle occupant by using said output signal and that determines on the basis of said periodic checking of said output signal whether to actuate said secondary inflation fluid source.

4. An apparatus as set forth in claim 3 wherein:
   said means for sensing the position of the vehicle occupant comprises at least one sensor for sensing the position of the torso of the vehicle occupant relative to the seatback of the vehicle occupant's seat.

5. An apparatus for helping to protect a vehicle occupant, said apparatus comprising:
   an inflatable vehicle occupant protection device;
   a primary inflation fluid source and a secondary inflation fluid source actuatable independently of each other;
   means for actuating said primary inflation fluid source to inflate said inflatable device in a first direction toward the vehicle occupant to help protect the vehicle occupant without actuating said secondary inflation fluid source;
   means for sensing the position of the vehicle occupant subsequent to actuation of said primary inflation fluid source and for providing an output signal; and
   means for actuating said secondary inflation fluid source in response to said output signal indicating movement of the vehicle occupant in said first direction.

6. An apparatus as set forth in claim 5 wherein said means for sensing the position of the vehicle occupant comprises at least one sensor for sensing the position of the torso of the vehicle occupant relative to the seatback of the vehicle occupant's seat.

7. An apparatus as set forth in claim 5 wherein said means for actuating said secondary inflation fluid source in response to said output signal comprises a controller that periodically checks the position of the vehicle occupant by using said output signal and that determines on the basis of said periodic checking of said output signal whether to actuate said secondary inflation fluid source.

8. An apparatus as set forth in claim 7 wherein said means for sensing the position of the vehicle occupant comprises at least one sensor for sensing the position of the torso of the vehicle occupant relative to the seatback of the vehicle occupant's seat.

9. An apparatus for helping to protect a vehicle occupant, said apparatus comprising:
   an inflatable vehicle occupant protection device;
   a primary inflation fluid source and a secondary inflation fluid source actuatable independently of each other;
   means for actuating said primary inflation fluid source to inflate said inflatable device to help protect the vehicle occupant without actuating said secondary inflation fluid source;

means for sensing the position of the vehicle occupant subsequent to actuation of said primary inflation fluid source and for providing an output signal; and means for actuating said secondary inflation fluid source in response to said output signal, wherein said means for sensing the position of the vehicle occupant comprises at least one sensor for sensing the position of the torso of the vehicle occupant relative to the seatback of the vehicle occupant's seat.

10. An apparatus for helping to protect a vehicle occupant, said apparatus comprising:

an inflatable vehicle occupant protection device;

a primary inflation fluid source and a secondary inflation fluid source actuatable independently of each other;

a first initiator being actuatable to actuate said primary inflation fluid source to inflate said inflatable device without actuating said secondary inflation fluid source;

a sensor for sensing the position of the vehicle occupant subsequent to actuation of said primary inflation fluid source and for providing an output signal indicative of the sensed position; and a second initiator being actuatable to actuate said secondary inflation fluid source in response to said output signal, wherein said sensor comprises at least one sensor for sensing the position of the torso of the vehicle occupant relative to the seatback of the vehicle occupant's seat.

11. An apparatus as set forth in claim 10 further including a controller that is electrically connected to said sensor, said controller receiving said output signal and determining, on the basis of said output signal, whether to actuate said second initiator.

12. An apparatus for helping to protect a vehicle occupant, said apparatus comprising:

an inflatable vehicle occupant protection device;

a primary inflation fluid source and a secondary inflation fluid source actuatable independently of each other;

a first device for actuating said primary inflation fluid source to inflate said inflatable device to help protect the vehicle occupant without actuating said secondary inflation fluid source;

a sensor mechanism for sensing the position of the vehicle occupant subsequent to actuation of said primary inflation fluid source and for providing an output signal, said sensor mechanism being operable to sense occupant position independent of pressure within said inflatable vehicle occupant protection device; and a second device for actuating said secondary inflation fluid source in response to said output signal.

13. An apparatus for helping to protect a vehicle occupant, said apparatus comprising:

an inflatable vehicle occupant protection device;

a plurality of inflation fluid sources, each of said plurality of inflation fluid sources being actuatable independently for providing inflation fluid for inflating said vehicle occupant protection device;

a crash sensor for sensing a vehicle crash condition and for providing a crash condition signal indicative of the sensed crash condition;

an occupant position sensor for sensing vehicle occupant position and for providing an occupant position signal indicative of the sensed occupant position; and a controller that is responsive to both the crash condition signal and the occupant position signal for actuating a desired number of said plurality of inflation fluid sources for controlling inflation of said vehicle occupant protection device, said occupant position sensor continuing to provide an occupant position signal subsequent to inflation of said vehicle occupant protection device, said controller being responsive to the occupant position signal subsequent to inflation of said vehicle occupant protection device for actuating any remaining unactuated inflation fluid sources of said plurality of inflation fluid sources.

* * * * *